(12) United States Patent
Lee et al.

(10) Patent No.: US 10,313,147 B2
(45) Date of Patent: Jun. 4, 2019

(54) SYSTEM AND METHOD FOR CONTROLLING AN ELECTRONIC DEVICE

(71) Applicant: Samsung Electronics Co., Ltd., Gyeonggi-do (KR)

(72) Inventors: Kangmin Lee, Gyeonggi-do (KR); Hyungrae Cho, Seoul (KR); Jihyeon Kweon, Gyeonggi-do (KR); Seokmin Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 733 days.

(21) Appl. No.: 13/661,828

(22) Filed: Oct. 26, 2012

(65) Prior Publication Data

US 2013/0110261 A1 May 2, 2013

(30) Foreign Application Priority Data

Oct. 26, 2011 (KR) ........................ 10-2011-0109809

(51) Int. Cl.
*H04L 12/28* (2006.01)
*H04L 29/08* (2006.01)

(52) U.S. Cl.
CPC ...... *H04L 12/2818* (2013.01); *H04L 12/2814* (2013.01); *H04L 67/34* (2013.01)

(58) Field of Classification Search
USPC .......................................................... 700/28
See application file for complete search history.

(56) References Cited

U.S. PATENT DOCUMENTS

| | | | | |
|---|---|---|---|---|
| 2001/0041982 A1* | 11/2001 | Kawasaki | ............... | G10L 15/26 704/275 |
| 2003/0009265 A1* | 1/2003 | Edwin | .................... | G06Q 10/06 700/295 |
| 2003/0037681 A1* | 2/2003 | Zhu | ........................... | A23L 5/13 99/325 |
| 2005/0035854 A1* | 2/2005 | Gupta et al. | .................. | 340/531 |
| 2006/0068759 A1 | 3/2006 | Ikebe et al. | | |
| 2006/0168178 A1 | 7/2006 | Hwang et al. | | |
| 2006/0220830 A1* | 10/2006 | Bennett, III | ........ | H04L 12/2803 340/506 |
| 2008/0046387 A1* | 2/2008 | Gopal | .................... | G01D 4/004 705/412 |

(Continued)

FOREIGN PATENT DOCUMENTS

| KR | 1020070098170 | 10/2007 |
|---|---|---|
| KR | 1020100079474 | 7/2010 |

(Continued)

OTHER PUBLICATIONS

European Search Report dated Jan. 27, 2016 issued in counterpart application No. 12843593.0-1853, 7 pages.

*Primary Examiner* — Jason Lin
(74) *Attorney, Agent, or Firm* — The Farrell Law Firm, P.C.

(57) ABSTRACT

A system and method for controlling an electronic device based on a state of the electronic device and external information. A system includes an electronic device for providing a search word; a server for providing operation information for operating the electronic device based on the search word; and a managing device for acquiring the operation information corresponding to the search word, and controlling the electronic device based on the acquired operation information.

21 Claims, 16 Drawing Sheets

(56) References Cited

U.S. PATENT DOCUMENTS

| | | | |
|---|---|---|---|
| 2008/0147205 A1* | 6/2008 | Ollis | G05B 15/02 |
| | | | 700/11 |
| 2008/0153465 A1* | 6/2008 | Evermann et al. | 455/414.1 |
| 2008/0282182 A1 | 11/2008 | Oosaka | |
| 2010/0319027 A1 | 12/2010 | Kim | |
| 2011/0040417 A1* | 2/2011 | Wolfe | G06F 1/206 |
| | | | 700/291 |
| 2011/0046805 A1* | 2/2011 | Bedros | H04L 12/2809 |
| | | | 700/291 |
| 2011/0098869 A1 | 4/2011 | Seo et al. | |
| 2011/0254723 A1 | 10/2011 | Tsurumoto et al. | |
| 2011/0270452 A1* | 11/2011 | Lu | G05B 19/042 |
| | | | 700/291 |
| 2012/0053740 A1* | 3/2012 | Venkatakrishnan | G06F 1/3203 |
| | | | 700/291 |
| 2012/0079091 A1* | 3/2012 | Ermis | H04L 41/024 |
| | | | 709/223 |
| 2012/0144422 A1 | 6/2012 | Han | |
| 2015/0073612 A1* | 3/2015 | Ireland | H04L 12/2816 |
| | | | 700/295 |

FOREIGN PATENT DOCUMENTS

| | | |
|---|---|---|
| KR | 1020100086781 | 8/2010 |
| WO | WO 02/13526 | 2/2002 |

* cited by examiner

FIG. 13

| ELECTRONIC DEVICE OPERATION STATE | OPERATION LOW OUTDOOR TEMPERATURE | OPERATION CONCENTRATION COOLING BEFORE PEAK TIME | OPERATION PeakTime LIMIT COOLING | OPERATION BEFORE OUTING LIMIT COOLING | STOP OUTING | OPERATION COOLING BEFORE USER'S RETURN | OPERATION OUTDOOR TEMPERATURE GRADUALLY REDUCED | OPERATION HIGH OUTDOOR HUMIDITY |
|---|---|---|---|---|---|---|---|---|
| OPERATION FUNCTION | COOLING (110%) REMOVE HUMIDITY (30%) | COOLING (110%) REMOVE HUMIDITY (50%) | COOLING (50%) REMOVE HUMIDITY (50%) | COOLING (20%) REMOVE HUMIDITY (20%) | STANDBY POWER BLOCKING | COOLING (50%) REMOVE HUMIDITY (50%) | COOLING (30%) REMOVE HUMIDITY (30%) | COOLING (110%) REMOVE HUMIDITY (100%) |
| HOME SCHEDULE | | | | | OUTING | OUTING | | |
| WEATHER (TEMPERATURE/ HUMIDITY) | 24°C/60% | 30°C/70% | 30°C/60% | 31°C/60% | 32°C/70% | 31°C/70% | 29°C/80% | 24°C/100% |
| ELECTRIC CHARGES BY TIME PERIODS (KWa) | 43.5W | 88.7W | 154.6W | 154.6W | 154.6W | 154.6W | 88.7W | 88.7W |
| | 09:00 | 12:00 | 13:00 | 14:00 | 15:00 | 16:00 | 17:00 | 19:00 |

1305 — ELECTRONIC DEVICE OPERATION STATE
1304 — OPERATION FUNCTION
1303 — HOME SCHEDULE
1302 — WEATHER
1301 — ELECTRIC CHARGES BY TIME PERIODS

FIG. 14

| | | | | | | | | | |
|---|---|---|---|---|---|---|---|---|---|
| ELECTRONIC DEVICE OPERATION STATE | OPERATION LOW INDOOR/OUTDOOR TEMPERATURE | OPERATION CONCENTRATION COOLING BEFORE PEAK TIME | OPERATION PeakTime GENERAL COOLING | OPERATION HUMAN MODE OPERATION ACCORDING TO OUTING | STOP HUMAN MODE OPERATION ACCORDING TO OUTING | OPERATION HUMAN MODE OPERATION ACCORDING TO OUTING | OPERATION RELEASE PEAK TIME, CONCENTRATION COOLING | OPERATION LOW INDOOR/OUTDOOR TEMPERATURE | |
| OPERATION FUNCTION | GENERAL COOLING (50%) | CONCENTRATION COOLING (100%) | GENERAL COOLING (50%) | HUMAN MODE (10%) | HUMAN MODE (10%) | HUMAN MODE (10%) | CONCENTRATION COOLING (10%) | GENERAL COOLING (50%) | |
| HOME SCHEDULE | | | | OUTING | OUTING | OUTING | OUTING | | |
| WEATHER (TEMPERATURE/ HUMIDITY) | 24°C/60% | 30°C/70% | 30°C/60% | 31°C/60% | 32°C/70% | 31°C/70% | 29°C/80% | 24°C/100% | |
| INTERNAL TEMPERATURE (REFRIGERATION ROOM) | 2°C | 1°C | 1°C | 2°C | 2°C | 3°C | 1°C | 1°C | |
| ELECTRIC CHARGES BY TIME PERIODS (KWa) | 43.5W | 88.7W | 154.6W | 154.6W | 154.6W | 154.6W | 88.7W | 88.7W | |
| | 09:00 | 12:00 | 13:00 | 14:00 | 15:00 | 16:00 | 17:00 | 19:00 | |

FIG. 15

| | 09:00 | 12:00 | 13:00 | 14:00 | 15:00 | 16:00 | 17:00 | 19:00 |
|---|---|---|---|---|---|---|---|---|
| ELECTRONIC DEVICE OPERATION STATE | OPERATION | OPERATION | OPERATION PeakTime | STOP Outing | STOP Outing | STOP Outing | OPERATION | OPERATION |
| OPERATION FUNCTION | GENERAL MODE | GENERAL MODE | POWER SAVING MODE (CONTROL SCREEN BRIGHTNESS) | STANDY POWER BLOCKING | STANDY POWER BLOCKING | STANDY POWER BLOCKING | GENERAL MODE | GENERAL MODE |
| HOME SCHEDULE | | | | Outing | Outing | Outing | | |
| WEATHER (TEMPERATURE/ HUMIDITY) | 24°C/60% | 30°C/70% | 30°C/60% | 31°C/60% | 32°C/70% | 31°C/70% | 29°C/80% | 24°C/100% |
| ELECTRIC CHARGES BY TIME PERIODS (KWa) | 43.5₩ | 88.7₩ | 154.6₩ | 154.6₩ | 154.6₩ | 154.6₩ | 88.7₩ | 88.7₩ |

1505 — ELECTRONIC DEVICE OPERATION STATE
1504 — OPERATION FUNCTION
1503 — HOME SCHEDULE
1502 — WEATHER (TEMPERATURE/HUMIDITY)
1501 — ELECTRIC CHARGES BY TIME PERIODS (KWa)

SYSTEM AND METHOD FOR CONTROLLING AN ELECTRONIC DEVICE

PRIORITY

This application claims priority under 35 U.S.C. § 119(a) to Korean Patent Application Serial No. 10-2011-0109809, which was filed on Oct. 26, 2011 in the Korean Intellectual Property Office, the entire disclosure of which is hereby incorporated by reference.

BACKGROUND OF THE INVENTION

1. Field of the Invention

The present invention relates to a system and method for controlling an electronic device, and more particularly, to a system and method for efficiently controlling an electronic device in consideration of a state of the electronic device and external information.

2. Description of the Related Art

With the development of electronic communication technology, remote control of various electronic devices, such as lighting controls, thermostats, and various electronic appliances such as TeleVisions (TV), computers, electric fans, refrigerators, ovens, etc., is possible through a network.

More specifically, the electronic devices connect with a managing device in different wired or wireless schemes. The managing device also connects with a terminal in different wired or wireless schemes. When a user of the terminal selects a function, i.e., an execution command, to be performed by an electronic device, e.g., powering on, the execution command is transferred from the terminal, to the managing device, and then to the electronic device, so that the electronic device operates according to the execution command.

As described above, the user may operate various electronic devices using the terminal.

However, many newer electronic devices provide a large number of operation modes and scheduling functions, which cannot be efficiently used through remote control because the operation modes of the electronic devices are too complex.

For example, a newer washing machine has a number of functions such as bubble wash, bubble echo, air deodorization, air sterilization, small load, rapid speed, etc. However, the conventional art does consider an amount of clothes that require washing or external situations, such as current energy costs. Consequently, even if it were possible to control all of the various functions of the washing machine, the washing machine would still be inefficiently used.

Accordingly, because using electronic devices is often complicated and inconvenient, a user cannot efficiently use all of the functions provided from the electronic device via remote control.

SUMMARY OF THE INVENTION

The present invention has been designed to address at least some of the above problems, and to provide at least the advantages described below.

Accordingly, an aspect of the present invention is to provide a system and method for controlling an electronic device, wherein the electronic device is efficiently used in consideration of a current state of the electronic device and external information.

In accordance with an aspect of the present invention, a method for controlling an electronic device by a managing device is provided. The method includes receiving, by the managing device, a search word for operating the electronic device; acquiring operation information based on the received search word; and controlling the electronic device based on the acquired operation information.

In accordance with another aspect of the present invention, a method for controlling an electronic device is provided, which includes receiving, by the electronic device, a search word for operating the electronic device; transmitting, by the electronic device, the received search word to a managing device; receiving, by the managing device, the search word from the electronic device; transmitting, by the managing device, the search word to a server; acquiring, by the server, operation information of the electronic device based on the search word; transmitting, by the server, the acquired operation information of the electronic device to the managing device; and controlling, by the managing device, an operation of the electronic device based on the acquired operation information.

In accordance with another aspect of the present invention, an electronic device is provided, which includes a communication unit for transmitting a search word for operating the electronic device to a managing device, and receiving operation information corresponding to the search word from the managing device; and a controller for controlling an operation of the electronic device based on the operation information.

In accordance with another aspect of the present invention, a managing device is provided, which includes a communication unit for receiving a search word for operating an electronic device and operation information corresponding to the search word; and a device management controller for acquiring the operation information based on the search word and controlling the electronic device based on the operation information.

In accordance with a further aspect of the present invention, a terminal is provided, which includes an input for receiving a search word for operating an electronic device; a radio frequency communication unit for transferring the received search word to a managing device, and receiving operation information corresponding to the search word from the managing device; and a terminal controller for controlling the electronic device based on the received operation information.

In accordance with another aspect of the present invention, a server is provided, which includes a communication unit for receiving a search word for operating an electronic device from a managing device; and a controller for acquiring operation information for operating the electronic device based on the search word, and providing the acquired operation information to the managing device through the communication unit.

In accordance with another aspect of the present invention, a system is provided, which includes an electronic device for providing a search word; a server for providing operation information for operating the electronic device based on the search word; and a managing device for acquiring the operation information corresponding to the search word, and controlling the electronic device based on the acquired operation information.

BRIEF DESCRIPTION OF THE DRAWINGS

The above and other aspects, features, and advantages of the present invention will be more apparent from the following detailed description in conjunction with the accompanying drawings, in which:

FIG. 13 is a diagram illustrating functions of an air conditioner based on environmental conditions according to an embodiment of the present invention;

FIG. 14 is a diagram illustrating functions of a refrigerator according to environmental conditions according to an embodiment of the present invention;

FIG. 15 is a diagram illustrating functions of a TV according to environmental conditions according to an embodiment of the present invention.

DETAILED DESCRIPTION OF EMBODIMENTS OF THE INVENTION

Figure 1:
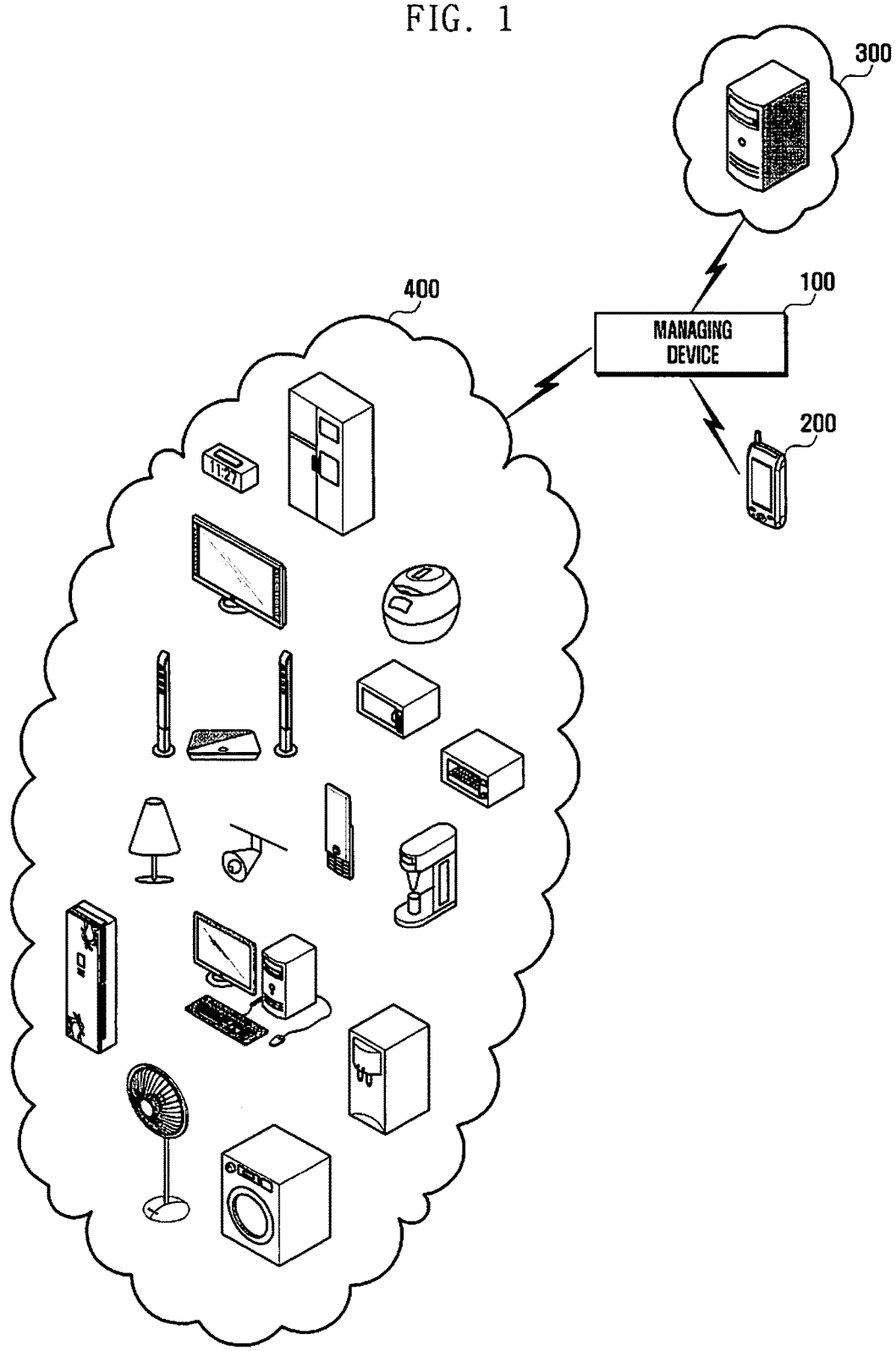
FIG. 1 illustrates a system for controlling an electronic device according to an embodiment of the present invention.

Various embodiments of the present invention are described in detail below with reference to the accompanying drawings. Throughout the drawings, the same reference numbers are used throughout the drawings to refer to the same or like parts. Further, detailed descriptions of well-known functions and structures incorporated herein may be omitted to avoid obscuring the subject matter of the present invention.

In accordance with an embodiment of the present invention a current state of an electronic device and external information relating to the electronic device are analyzed to receive operation information having an optimal function and an operation time and to execute the electronic device based on the received operation information.

Herein, a system for constructing and integrally managing electronic devices by a network is referred to as a "home network system". The home network system networks home electronics devices (e.g., TVs, washing machines, microwave ovens, gas ranges, audio players, air conditioners, boilers, etc.), lighting controls, gas valves, door locks, etc., to connect to a controller such as a home gateway or a home server, and uses a portable terminal as a remote control.

Digital Living Network Alliance (DLNA), formerly known as Digital Home Working Group (DHWG), is a standardization body that is attempting to establish a compatible platform based on the already established industry standards and to realize convergence across the industries. The DLNA promotes the introduction of a guideline among the industries based on the Universal Plug and Play (UPnP) protocols, which have been widely used in the manufacture of home appliances, personal computers, wireless devices, etc.

UPnP is technology with which information appliance devices connect to a network to communicate with each other without complicated settings, wherein one device automatically searches for a service of another device.

The current guidelines introduced by DLNA have provided a design principle capable of sharing content between different brands and products through a wired/wireless home network between electronic appliances, PCs, and wireless devices. Accordingly, products designed according to the guidelines are capable of sharing media content such as music, photographs, video, etc., through the home network.

When sharing content between home devices in the home network environment based on DLNA, a home network data sharing system controls a service in consideration of characteristics of the devices and a communication environment, and is operatively associated with various services over a communication network to a service of excellent quality.

Examples of a communication module to be included in the electronic device include a $3^{rd}$ Generation (3G) communication module, a $4^{th}$ Generation (4G) communication module, a Wi-Fi communication module, and a Zigbee® communication module.

For example, an electronic device may be a smart TV, a smart phone, smart appliance (refrigerator or washer) etc.

FIG. 1 illustrates a system for controlling an electronic device according to an embodiment of the present invention.

Referring to FIG. 1, the system includes a managing device 100, a terminal 200, a server 300, and electronic devices 400.

The managing device 100 controls the electronic devices 400. For example, the managing device 100 stores identification information, a driving pattern, and a software pattern for the electronic devices 400 connected to the managing device 100 to control execution of the electronic devices 400.

The electronic devices 400 include household electronic appliances, office devices used in an office, medical devices in a hospital, and industry devices used in a factory. For example, the electronic devices include TVs, refrigerators, washing machines, computers, electric fans, air conditioners, Digital Versatile Disc (DVD) players, audio players, external speakers, game machines, boilers, lighting controls, microwave ovens, gas ranges, Digital Signage (DS), Large Format Displays (LFDs), digital cameras, vacuums, security devices, etc.

In FIG. 1, the terminal 200, e.g., a smart phone or a tablet PC, receives user input through a Graphic User Interface (GUI) to remotely control at least one of the electronic devices 400. For example, the terminal 200 transmits an execution command with respect to a certain electronic device to the managing device 100, which transfers the execution command to a designated electronic device, such that the electronic device executes a function corresponding to the execution command.

A wireless interface supporting communication of the terminal 200 with the electronic devices 400 or the managing device 100 may include an interface of a near distance communication protocol such as Radio frequency Identification (RFID), BLUETOOTH®, Near Field Communication (NFC)®, Infrared Data Association (IrDA)®, and Zigbee®.

The server 300 transmits a control command of the electronic devices 400 to the managing device 100 according to a request of the managing device 100 or in a push scheme. For example, the server 300 is connected to the managing device 100 in various wireless communication schemes such as Wi-Fi, Wibro, 3G, and 2G.

The managing device 100 controls the electronic devices 400 according to the corresponding control commands received from the server 300.

The control command includes operation information, which for operating a corresponding electronic device according to a search word input through an input unit of the terminal 200 or an input unit of the corresponding electronic device. Alternatively, the operation information may be firstly provided from the server 300.

Further, the managing device 100 receives the operation information from the sever 300, and stores and manages the received operation information.

The search word may indicate contents included in the electronic device. For example, when the electronic device is a washing machine and the contents include a cotton quilt that may be washed by the washing machine, the search word is the cotton quilt.

Further, when the electronic device is a microwave oven, the search word may be a type of food.

When any of the electronic devices 400 include an input unit (not shown) and the search word is input through an input unit of an electronic device, device information (device type, device performance, etc.) of the electronic device may be automatically displayed or input.

When the search word is input to the terminal 200 or the managing device 100, an electronic device list indicated on the terminal 200 or the managing device is selected, and the selected electronic device list may be input together with information with respect to the selected electronic device.

The operation information may indicate operation information by situations optimized in an electronic device according to a search situation (environmental elements such as weather or temperature) or a search object (object whose characteristic is changed according to an operation of an electronic device) corresponding to a search word.

The operation information by situations may indicate operation information capable of operating a corresponding electronic device according to a search word input from the user. The operation information by situations may be primarily provided from the server 300. The operation information by situations may be stored and managed in the managing device 100.

The operation information by situations may also include operation information by situations optimized in an electronic device according to a search situation (environmental elements such as weather or temperature) or a search object (object whose characteristic is changed according to an operation of an electronic device) corresponding to a search word.

Figure 2:
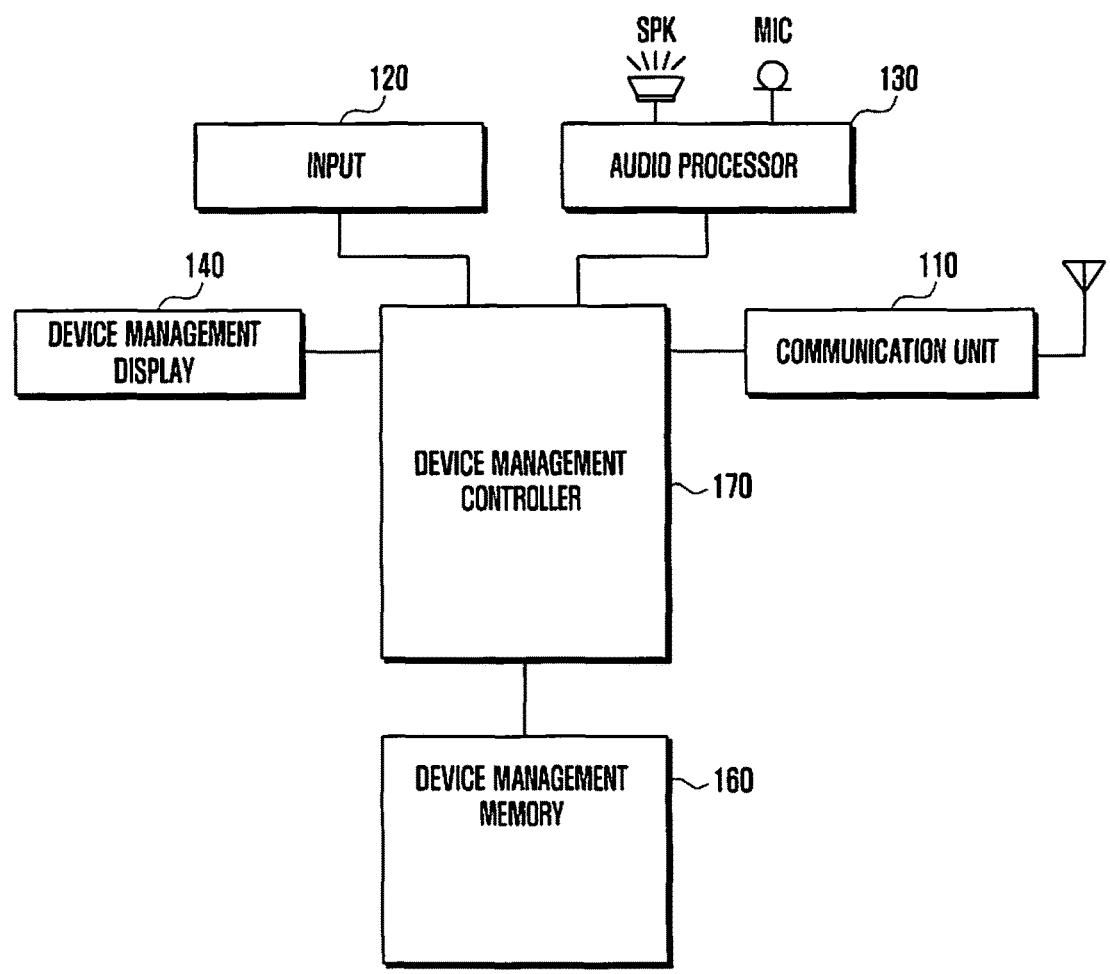
FIG. 2 is a block diagram illustrating a managing device according to an embodiment of the present invention.

FIG. 2 is a block diagram illustrating a managing device 100 according to an embodiment of the present invention.

Referring to FIG. 2, the managing device 100 includes a communication unit 110, an input 120, an audio processor 130, a device management display 140, a device management memory 160, and a device management controller 170.

The communication unit 110 forms a wired/wireless communication channel (hereinafter referred to as a "data communication channel") for transceiving data such as a control signal or a data package under control of the device management controller 170. For example, the communication unit 110 forms a wired/wireless communication channel for communicating with the terminal 200, the server 300, and the electronic devices 400. Accordingly, the communication unit 110 transmits data for management between the structural elements of the communication system under control of the device management controller 170 through the data communication channel.

For example, the communication unit 110 receives a device management control command from the server 300, transmits the device management control command to a certain electronic device, receives the device management control command from the terminal 200 or the electronic device, or transmits the device management control command from the terminal 200 to the certain electronic device.

The input 120 may include various input devices for receiving a search word, i.e., numerical or character information, and setting various functions. For example, the input 120 includes a plurality of input keys, function keys, i.e., either physical keys or keys displayed on a touch panel.

A search word for operation information of an electronic device may be input to the input unit 120. The operation information may include information for operating a corresponding electronic device according to the search word input by the user. The input search word is transferred to the device management controller 170 and may be used to request operation information for the electronic device according to the search word from the server 300, through the communication unit 110.

Accordingly, the device management controller 170 generates the device management control command for controlling the electronic devices 400 according to operation information of the electronic devices 400 received from the server 300.

The audio processor 130 includes a speaker SPK for playing audio data according to various execution modes or a function selection of the managing device 100 and a microphone MIC for receiving a voice signal of a user for setting an execution mode or executing a function. The audio processor 130 outputs a signal or an effect sound indicating control of the electronic devices 400. Further, when the electronic devices 400 are executed according to the operation information, the audio processor 130 may output a warning sound. The warning sound or the effect sound may be omitted according to user setting.

The device management display 140 displays information input by the user and information provided to the user, such as various menus of the managing device 100. That is, the device management display 140 displays a screen indicating a search word input by the user and operation information of an electronic device according to the search word. Further, a screen indicating operation information of the electronic device received from the server 300 may be displayed.

The device management memory 160 stores at least one application program for a function operation of the managing device 100, data created by the user, and a message transceived in a communication system, and data according to execution of an application program.

The device management memory 160 may also store an Operating System (OS) for booting the managing device 100 and for operating the foregoing structural elements, and an application program for controlling the electronic devices 400.

Additionally, the device management memory 160 stores a program for controlling the electronic devices 400 and user information using the electronic devices 400 according to operation information of the electronic devices 400.

A control signal for operation information of the electronic devices 400 may be acquired through a data communication channel formed between the server 300 and the managing device 100 under control of the device management controller 170.

The managing device 100 accumulates and store the operation information in the device management memory 160.

When an electronic device requests the operation information from the managing device 100, i.e., when a search word is input, the managing device 100 searches the operation information from the device management memory 160 to determine whether to provide the operation information to the electronic devices 400.

Figure 3:
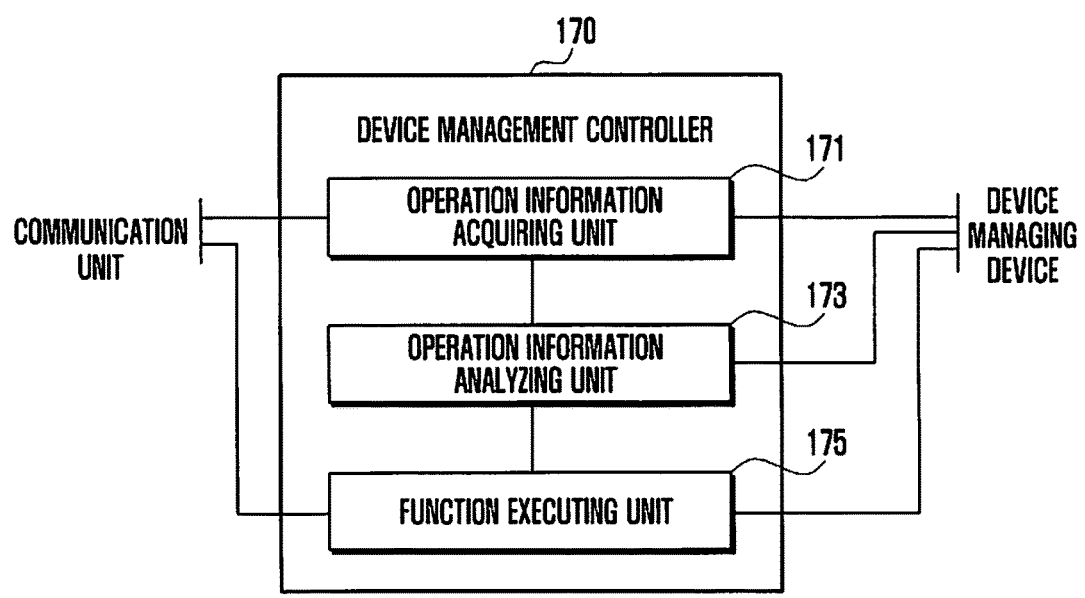
FIG. 3 is a block diagram illustrating a device management controller according to an embodiment of the present invention.

FIG. 3 is a block diagram illustrating a device management controller according to an embodiment of the present invention.

Referring to FIG. 3, the device managing controller 170 includes an operation information acquiring unit 171, an operation information analyzing unit 173, and a function executing unit 175.

The operation information acquiring unit 171 acquires a search word through the communication unit 110. When the operation information acquiring unit 171 acquires a search word that does not correspond to an electronic device, it may indicate a wrong search word through the audio processor 130 or the device management controller 140.

The operation information and the search work may be defined as described below.

For example, operation information by situations for a washing machine may indicate type and amount of washing object(s), external weather state, or electricity used efficiency (night-time electricity).

Accordingly, a search word to be input to the input 120 may include the type and amount of washing objects, e.g., 5 cotton blankets.

The device management display 140 displays the type and amount of washing objects, the weather (collected weather information), and the used electricity efficiency (use of night-time electricity).

For example, operation information by situations for a microwave oven may include a recipe according to a type and an amount of food.

Accordingly, a search word to be input to the input unit may include a type and amount of food to be cooked, e.g., o5 pieces of bacon.

Detailed operation information by situations with respect to the microwave oven may also include an operation time and operation power consumption, whether or not the food should be reversed, or cook temperature, e.g., rare, medium rare, medium, well-done, etc.

For example, operation information by situations for an air conditioner may include operation information according to weather, time, and season.

Accordingly, a search word to be input may include temperature information.

Detailed operation information by situations with respect to the air conditioner may include that day's weather, current time, current external temperature, or function properties, e.g., the presence of an ion function, a nano silver function, or air cleaning function.

For example, operation information by situations for an electric blanket may include an external temperature, time (day, night), light amount, e.g., reduce driving temperature when there is a large amount of light, and increase the driving temperature when there is a small amount of light, operation information according to age or healthy state of a user, etc.

For example, operation information by situations for a vacuum cleaner may include a noise control function according to a day and a night, e.g., power control that drives the vacuum cleaner at a low power level at night, and drives the vacuum cleaner at a high power level during the day, steam cleaning, weather, etc.

Using the examples provided above, the operation information acquiring unit 171 transmits the acquired operation information to the operation information analyzing unit 173.

The operation information analyzing unit 173 analyzes the operation information acquired by the operation information acquiring unit 171.

The operation information may include ambient environment information or electronic device information, e.g., information indicating functions of the electronic device.

For example, when the electronic device is a microwave oven, the function of the electronic device indicates a temperature, an operation time, and an operation power for cooking a fish.

The operation information analyzing unit 173 generates data for operating the electronic device with reference to an external environment and a state of the electronic device. Accordingly, the operation information analyzing unit 173 receives data of the external environment from the server 300 through the communication unit 110. For example, the data of the external environment may indicate weather conditions such as temperature, humidity, strength of wind, time period, etc.

The operation information analyzing unit 173 analyzes the external environment and the function of the electronic device based on an input search word. The operation information analyzing unit 173 generates optimal operation information of the electronic device corresponding to the search word.

For example, when the search word is a cotton blanket and the electronic device is a washing machine, the operation information analyzing unit 173 may shorten a spin cycle during a clear, warm weather or increase the spin cycle during cloudy weather because a dry time of the cotton blanket will change according to the external environment, i.e., weather. Further, when shortening the spin, less electricity is used, thereby reducing the operating cost.

Further, a function for increasing a washing time or controlling an amount of a washing object may be selected according to a weight of the cotton blanket. The operation information analyzing unit 173 selects an optimal function of the electronic device based on the external environment and the input search word. The operation information analyzing unit 173 generates data for an operation of the electronic device through the foregoing procedure.

The generated operation information of the electronic device may be transmitted to a function executing unit 175 or be stored in a device management memory 160.

When a plurality of search words are acquired by the operation information acquiring unit 171, the operation information analyzing unit 173 compares the external environment and the functions of the electronic device based on the respective search words to select optimal functions of the electronic device. For example, overlapping functions of the selected optimal electronic devices with respect to the respective search words may be selected. When there is a great difference between the overlapping functions, a difference of the overlapping functions may be displayed through the audio processor 130 or the device management display unit 140.

For example, when the search words in the microwave oven are popcorn and milk, the amount of heat and time to heat the popcorn is very different from those the amounts to heat the milk. Accordingly, in order to prevent one of the foods from being improperly heated, and possibly ruined, the difference of the overlapping functions is displayed through the audio processor 130 or the device management display unit 140.

When the search words acquired by the operation information acquiring unit 171 are a search word of an upper concept and a search word of a lower concept belong to the upper concept, the operation information analyzing unit 173 may select one of the search word of the upper concept and the search word of the lower concept. For example, functions of an electronic device selected by the search word of the upper concept include all the functions of the electronic device to be driven by the search word of a lower concept, the operation information analyzing unit 173 may select the search word of the upper concept.

For example, the search word of the upper concept could be meat and the search word of a lower concept could include beef, pork, chicken etc. Like this, the search word of the upper concept includes the search word of the lower concept.

When functions of the selected electronic devices differ from each other because the search words acquired by the operation information acquiring unit 171 differ from each other, the operation information analyzing unit 173 may select all of the functions of electronic devices selected by the search words.

The operation information analyzing unit 173 combines electric charges by time periods of an electronic device, a schedule of the user, or weather to analyze operation information of the electronic device. For example, the operation information analyzing unit 173 selects a time period having the cheapest electric charges by time periods of electricity used by the electronic devices, reviews a schedule of the user to select a time period of an empty schedule, and selects a time period having suitable temperature and humidity in consideration of the external weather.

Accordingly, the operation information analyzing unit 173 may integrally review a time period having cheap electric charges, a time period having an empty schedule, and an external weather to select the most suitable time period. The operation information analyzing unit 173 then optimizes a function of an electronic device to provide efficient use and convenience of the use.

Further, the operation information analyzing unit 173 may reduce a use time and cost of the electronic device through the operation information of the electronic device.

The function executing unit 175 generates control commands of the electronic devices 400 based on the analyzed operation information from the operation information analyzing unit 173, and transmits the generated control commands to the electronic devices 400 to control the electronic devices 400.

Further, the function executing unit 175 may transmit the control command to the terminal 200 through the communication unit 110. The terminal 200 may then transmit the control command to the electronic devices 400.

The function executing unit 175 acquire operation information data stored in the device management memory 160 to control the electronic devices 400.

In accordance with an embodiment of the present invention, functions of an electronic device may be provided, which are categorized according to a current state and an external environment of the electronic device. For example, when the electronic device is a washing machine, a washing time or a drying time of the electronic device may be controlled.

Alternatively, the function executing unit 175 controls the electronic devices 400 based on the operation information, which is selected by comparing an external environment, and functions of the electronic device of a plurality of acquired operation information respectively to select optimal functions of the electronic device by the operation information analyzing unit 173.

Figure 4:
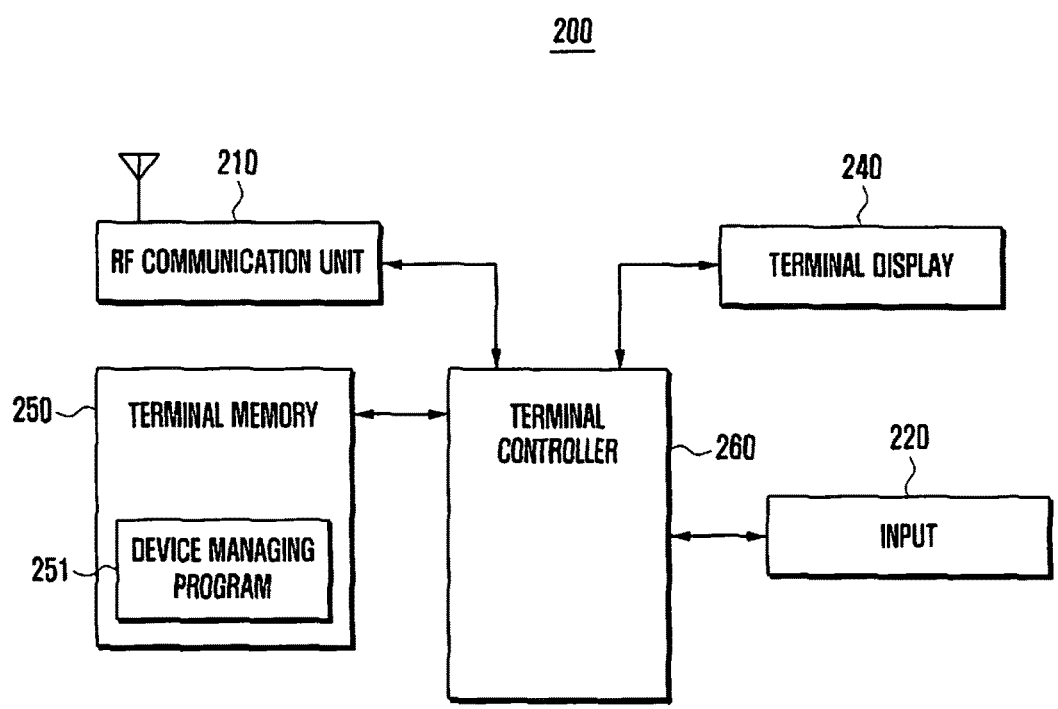
FIG. 4 is a block diagram illustrating a terminal according to an embodiment of the present invention.

FIG. 4 is a block diagram illustrating a terminal according to an embodiment of the present invention.

Referring to FIG. 4, the terminal 200 includes a radio frequency (RF) communication unit 210, an input 220, a terminal display 240, a terminal memory 250, and a terminal controller 260.

The terminal 200 communicates with the managing device 100 using the RF communication unit 210, receives various information associated with a control function of the electronic devices 400 provided from the managing device 100, and outputs the received information through the terminal display 240.

Further, the terminal 200 remotely controls at least one of the managing device 100 and the electronic devices 400 to perform a control function of an electronic device. The terminal 200 may be substituted for the managing device 100, and may provide a control function directly to the electronic device.

The RF communication unit 210 form a communication channel with the managing device 100 and receives information provided from the managing device 100, e.g., electronic device control setting screen interface information, an interface screen for selecting an electronic device, interface information for user input, or interface information for selecting a usable electronic device according to user information. The foregoing information may be transferred to the terminal controller 260.

When the managing device 100 controls the electronic devices 400, the RF communication unit 210 forms communication channels between the terminal 200 and the electronic devices 400, respectively.

The RF communication unit 210 performs the same function as that of the communication unit 110 of the managing device 100 to collect device information of the electronic devices 400. The collected device information may be transferred to the terminal controller 260, and the terminal controller 260 is substituted for the managing device 100 according to an operation design of the terminal 200, and generates a control signal of the electronic devices 400. Accordingly, the RF communication unit 210 receives control information of an electronic device from the server 300 and provides the received control information to the terminal controller 260.

A control command may be input to the terminal input 220 to control the electronic devices 400. The input control command is transferred to the terminal controller 260 to control the electronic devices 400.

For example, the input unit 200 includes various input devices for receiving input search words, and numerical or character information, and for setting various functions. For example, the input unit 220 includes a plurality of physical input keys and function keys, or a touch panel displaying input keys and function keys. The input unit 220 of the present invention may generate an input signal corresponding to a search word for operation information of electronic devices 400.

The terminal display 240 outputs various screens for operating the terminal 200. The terminal display 240 may be configured by a touch screen in the same manner as in the device display 140 of the managing device 100 and executes a function for inputting information to the managing device 100.

When the RF communication unit 210 receives information from the managing device 100, the terminal display 240 outputs the received information. For example, the terminal display 240 displays an electronic device setting interface or an electronic device setting interface according to a search word.

Alternatively, the foregoing interfaces may be generated and provided by the terminal 200 itself, without receiving information from the managing device 100. To do this, the terminal memory 250 stores a device managing program 251, which drives an electronic device control function of the present invention using the terminal 200.

The electronic device control management program, i.e., the device managing program 251 in FIG. 4, may remotely control a plurality of electronic devices 400 by accessing a web server in consideration of mobility of the terminal 200. In this case, the managing device 100 may be provided between the electronic devices 400 and the terminal 200, perform as a gateway, receive a control signal of the electronic device 400 of the terminal 200 via the web, and transmit the received control signal to the electronic devices 400. The terminal memory 250 may store an OS and various application programs for operating the terminal 200.

The terminal controller 260 controls signal flow, and transceiving of information according to various functions of the terminal 200 associated with a control function of electronic devices 400. For example, when the terminal 200 outputs information provided from the managing device 100 to the terminal display 240 and transmits an input signal of a user to the managing device 100, the terminal controller 260 receives and outputs at least one of the foregoing interfaces and information through the RF communication unit 210 to the terminal display 240.

When the user selects a certain item or inputs a preset value into a displayed interface, the terminal controller 260 transfers corresponding information to the managing device 100. The terminal controller 260 outputs information generated while the managing device 100 controls the electronic devices 400 through the terminal 200, and transfers a user request to the managing device 100.

When the terminal 200 is substituted for the managing device 100, i.e., directly controls the electronic devices 400, the terminal controller 260 performs a function of the device management controller 170, such that the terminal 200 may independently perform the foregoing interface arrangement and information output.

When the terminal 200 is spaced apart from a zone of the electronic devices 400 by greater than a predetermined distance in consideration of mobility of the terminal 200, the terminal controller 260 may form a communication channel for controlling the electronic devices 400 through network access and support signal transceiving.

As described above, the terminal 200 outputs information associated with operation control of the electronic devices 400 and transfers a corresponding input signal such that the user sets and operates an electronic device control function and confirms a corresponding result.

In addition, the terminal 200 supports various functions associated with an electronic device control function, e.g., an information providing function according to operation information of the electronic devices 400 or information provision such as a control limit function of the electronic devices 400 according to a search word.

Figure 5:
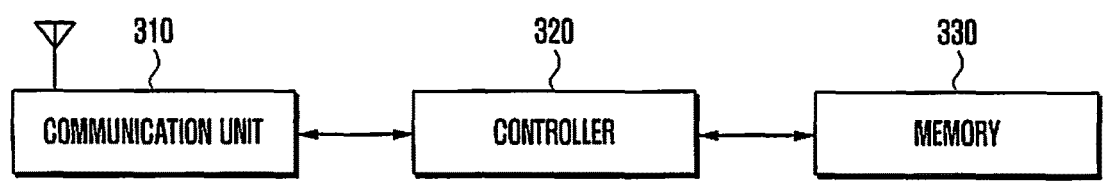
FIG. 5 is a block diagram illustrating a server for providing operation information according to an embodiment of the present invention.

FIG. 5 is a block diagram illustrating a server for providing operation information according to an embodiment of the present invention.

Referring to FIG. 5, the server 300 includes a communication unit 310, a controller 320, and a memory 330.

The communication unit 310 communicates with at least one of the managing device 100, the electronic devices 400, and the terminal 200. For example, the communication unit 310 communicates with the managing device 100 to transfer a command requested from the managing device to the controller 320.

The controller 320 analyzes a command received through the communication unit 310, and analyzes the electronic devices 400 to generate operation information suited to the command or select preset operation information. The controller 320 stores the operation information in the memory 330 or transmits the operation information to the managing device 100, the terminal 200, or the electronic devices 400 through the communication unit 310.

The controller 320 acquires information of the electronic devices 400 or external environment data through the Internet. The controller 320 may integrally analyze the acquired information of the electronic devices 400, the external environment data, and the receive command, namely, a search word to generate a command capable of operating the electronic devices 400 or to select a previously generated command.

The previous command may be set by the user using the electronic devices 400 or a command receiving operation information of the electronic devices 400 through the Internet.

The memory 330 stores a command received through the communication unit 310. Identification information of the electronic devices 400, information about an external environment, or operation information suited to the electronic device may be stored in the memory 330. Further, the operation information generated from the controller 320 may be stored in the memory 330.

Figure 6:
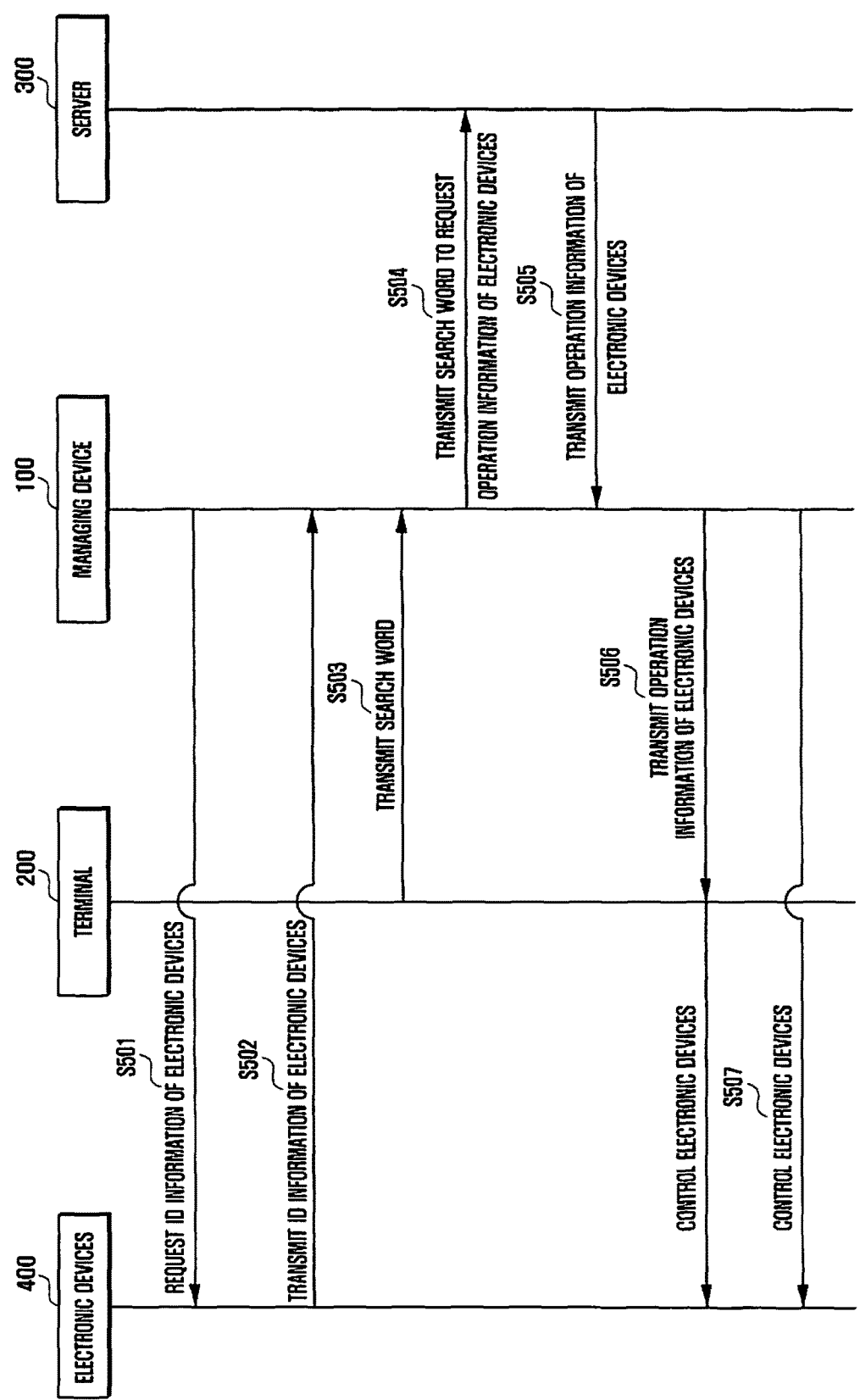
FIG. 6 is a signal flow diagram illustrating a method for controlling an electronic device according to an embodiment of the present invention.

FIG. 6 is a signal flow diagram illustrating a method for controlling an electronic device according to an embodiment of the present invention.

Referring to FIG. 6, the managing device 100 requests identification (ID) information of the electronic devices 400 from the electronic devices in step S501. Although not illustrated in FIG. 6, the managing device 100 may also request the ID of the electronic devices 400 from the terminal 200.

For example, the ID information requested may include device names, functions, and unique numbers of the electronic devices 400.

In step S502, the ID information of the electronic devices 400 is transmitted to the managing device 100. The identification information of the electronic devices 400 may be transmitted to the managing device 100 through the terminal 100, or directly transmitted from the electronic devices 400 to the server 300.

In step S503, a search word input to the terminal 200 is transmitted to the managing device 100. For example, the search word indicates objects operated by the electronic devices 400. Alternatively, the search word may be transmitted to the managing device 100 through the electronic devices 400, or may be directly input through an input of the managing device 100.

In step S504, the search word and information of the electronic devices 400 associated with the search word is transmitted to the server 300 to request operation information of the electronic devices 400 associated with the search word.

In step S505, the server 300 analyzes the search word, the information of the electronic devices 400 associated with the search word, and external environment data to generate operation information of the electronic devices 400 associated with the search word or to select preset operation information. The server 300 may acquire the preset operation information through a web site.

The preset operation information may be data in a web server up-loaded by users using the electronic devices 400, respectively. Further, the preset operation information may be data by optimizing functions of the electronic devices 400 according to the search word and the external environment to up-load in the web server.

The server 300 may download the information of the electronic devices 400 through the Internet, i.e., not from the electronic devices 400. The server 300 may acquire the external environment data from the managing device 100 or through the Internet. The managing device 100 may acquire the external environment data through the Internet. The external environment data may include at least one of electric charges by time periods of the electronic devices 400, temperature and humidity as an external weather, and home schedules of the user.

The server 300 or the managing device 100 may integrally review the search word and the external environment data in order to generate the operation information of the electronic devices 400.

Alternatively, the operation information of the electronic devices 400 may be directly transmitted from the server 300 to the device managing device 100, the terminal 200, or the electronic devices 400.

In step 506, the managing device 100 may be transmitted to the operation information of the electronic devices 400 received from the server 300 to the terminal 200.

The terminal 200 transmits a signal for controlling the electronic devices 400, based on the received operation information of the electronic devices, to associated electronic devices 400 to control the associated electronic devices 400. In step 507, the managing device 100 may directly transmit a signal for controlling the electronic devices 400 based on the operation information received from the server 300, to the associated electronic devices to directly control the associated electronic devices 400.

Next, screen interfaces output on at least one display of the managing device 100 and the terminal 200 will be described in detail with reference to the accompanying drawings. Hereinafter, the screen interface may be described based on a terminal display unit 240 of the terminal 200.

Figure 7:
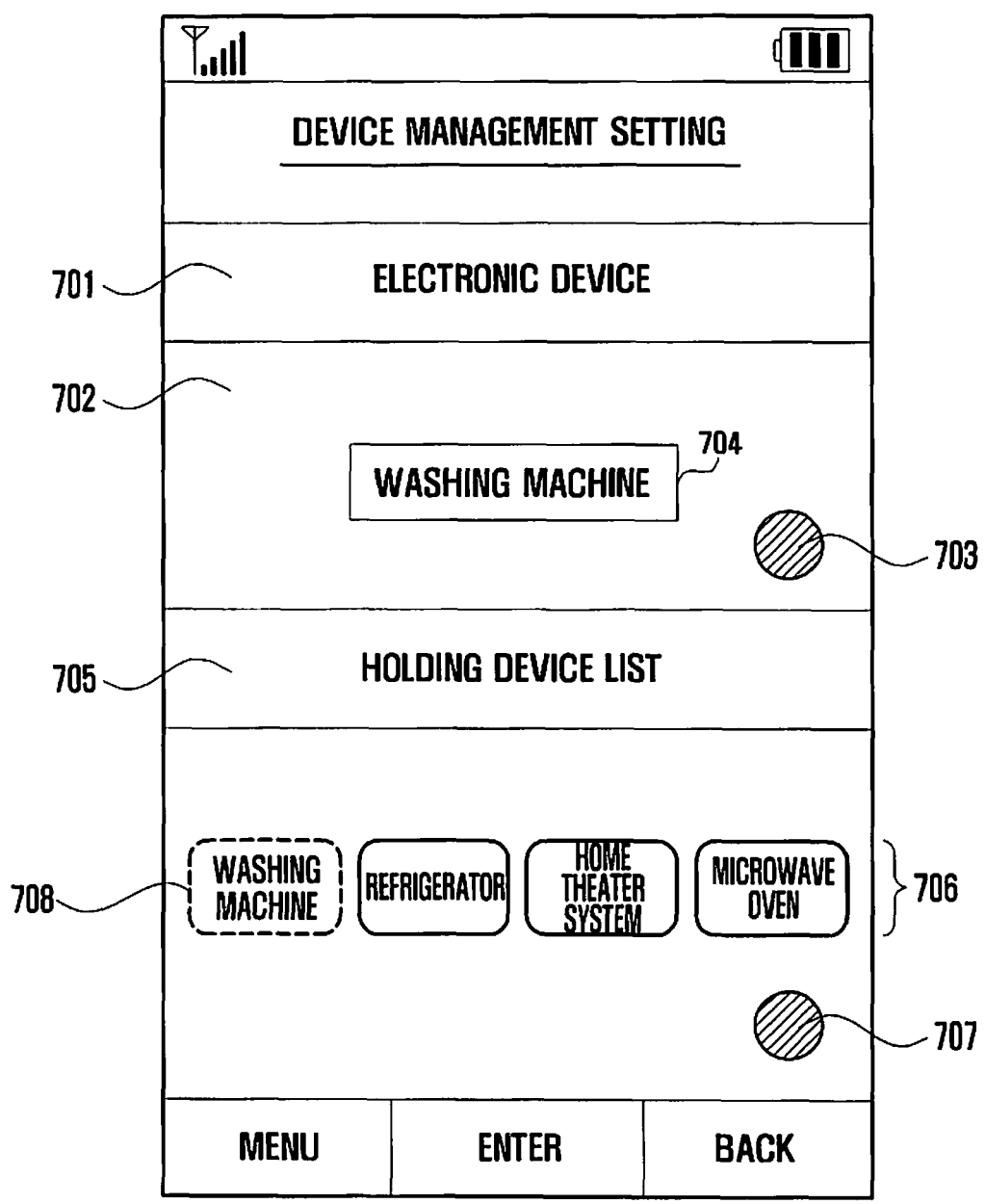
FIG. 7 illustrates an example of a user interface for device management setting, presented on a terminal display according to an embodiment of the present invention.

FIG. 7 illustrates an example of a user interface for device management setting displayed on a terminal according to an embodiment of the present invention.

Referring to FIG. 7, a user may generate an input signal for controlling the electronic devices 400 using the terminal 200. Accordingly, the terminal 200 provides a menu item for setting device management.

In FIG. 7, the terminal display 240 outputs a selected electronic device 702 and a holding electronic device list item 705.

To do this, the terminal 200 collects information of the electronic devices 400 or receives device information of the electronic devices 400 from a managing device 100. When receiving the device information of the electronic devices 400, the terminal 200 allocates an index with respect to corresponding devices, for example, icons or widgets, and outputs the allocated index at predetermined location of the terminal display 240, namely, the holding device list item 705.

Icons 706 corresponding to the electronic devices 400 are displayed under the holding device list item 705. Each of the icons 706 may be selected by a user to activate or deactivate the corresponding electronic device.

The device addition icon 707 is selected to add an electronic device. A method of adding the electronic device is achieved by inputting a name of the electronic device using a user interface or inputting a model name of the electronic device to be added.

An electronic device 701 indicates an electronic device selected from holding electronic devices items 705. For example, in FIG. 7, the washing machine 704 indicates the washing machine icon 708 has been selected from the holding device list item 705.

When the washing machine is selected as the electronic device 701, the washing machine icon 708 is displayed with dotted lines on the holding device list item 705. When the washing machine 704 is selected, only an icon of usable electronic of the electronic devices 706 displayed on the holding device list 705 may be activated.

To add another electronic device, an addition icon 703 may be selected to input information of the electronic device.

Otherwise, to add the other electronic device, one of respective from icons 706 may be drag to the selected electronic device 702.

The electronic devices 706 may be changed according to a taste or living environments of a user or as needed, or may be controlled according to types of the electronic devices 400 operated by the user. Moreover, the electronic device registered according to user information may be again controlled according to user setting.

Figure 8:
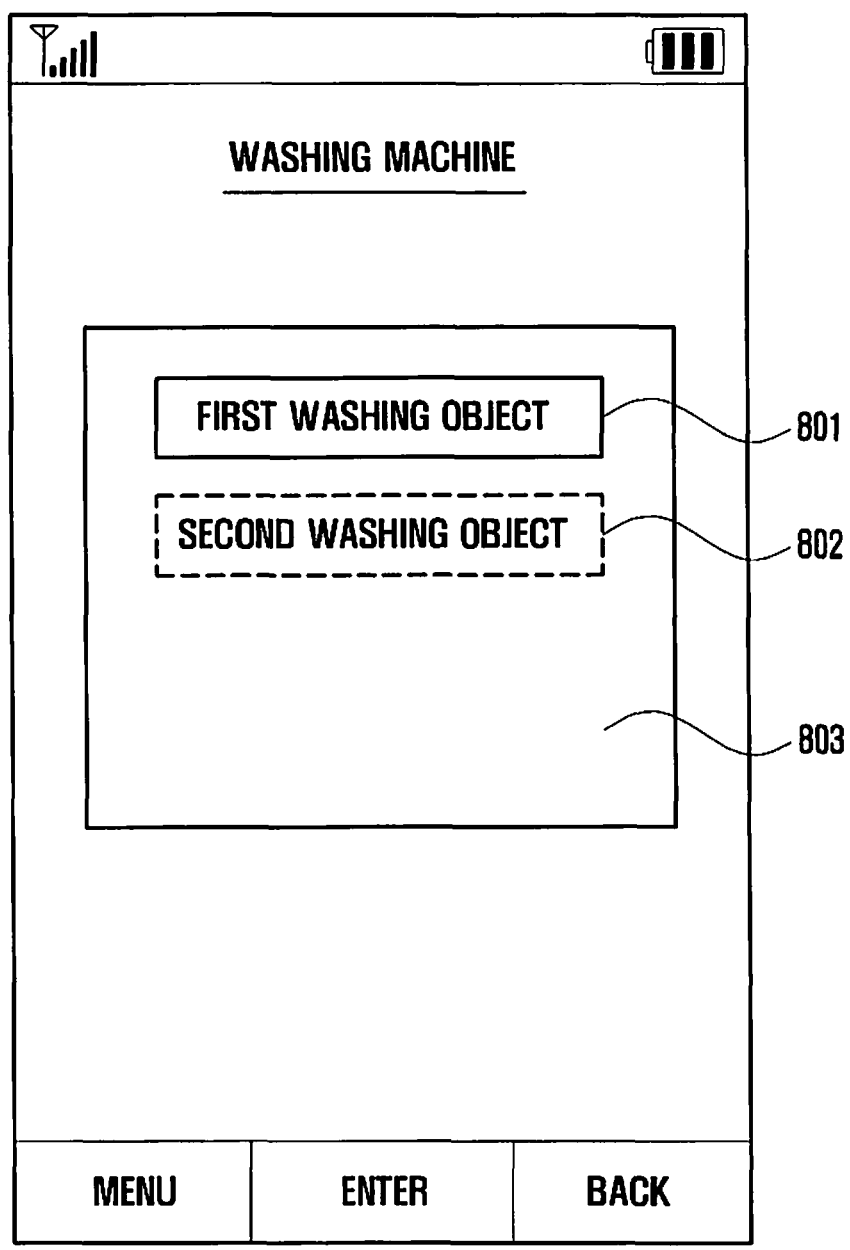
FIG. 8 illustrates an example of a user interface for a selected electronic device according to an embodiment of the present invention.

FIG. 8 illustrates an example of a user interface for a selected electronic device according to an embodiment of the present invention.

Referring to FIG. 8, when the electronic device icon 704 is selected, a screen interface for inputting a search word to be used in the selected electronic device is displayed. In FIG. 8, a first washing object 801 indicates a registered washing object, and the second washing object 802 indicates a washing object to be newly added. For example, when a user using the washing machine washes sacks and underwear, a first washing object 801 may become sacks and a second object 802 may become underwear. To add another washing object, interface screen 803 is used. Only usable functions of electronic devices may be selected based on the input information.

Figure 9:
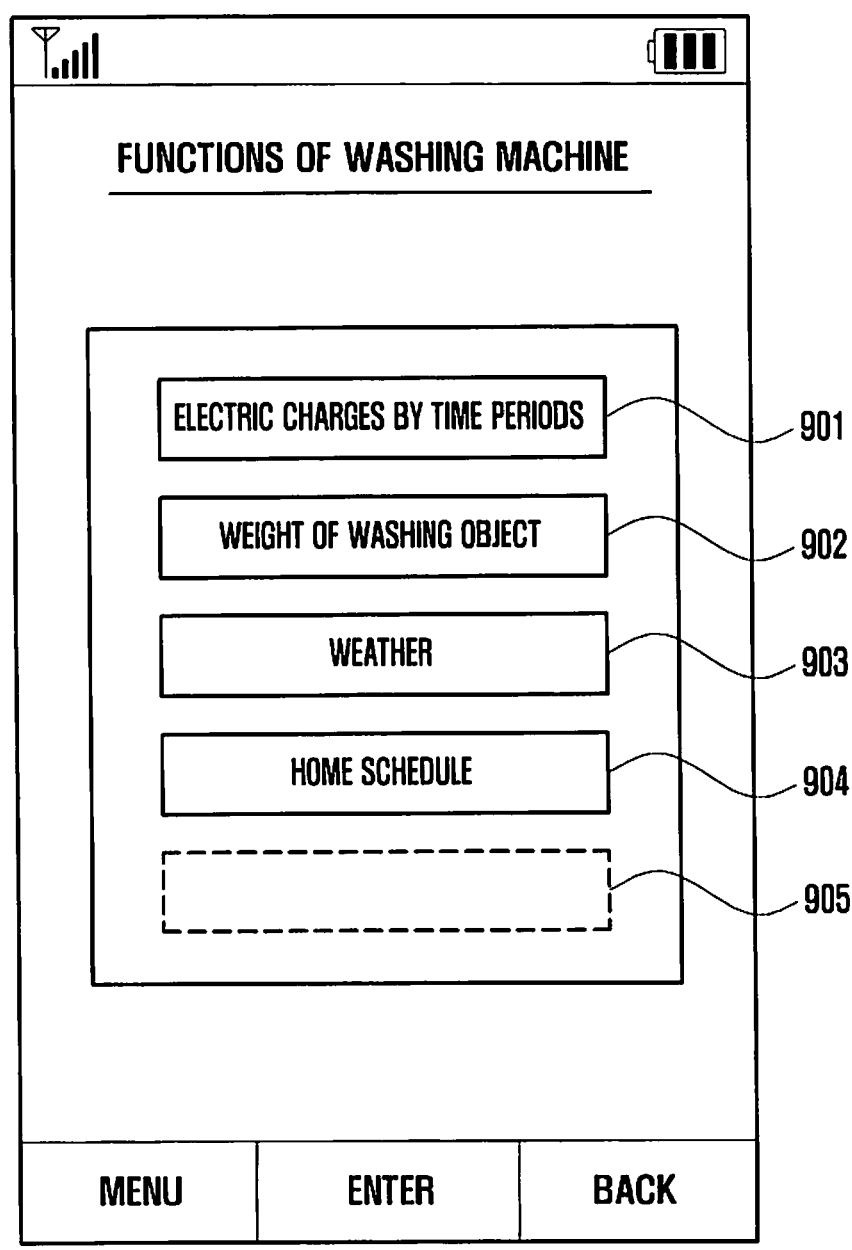
FIG. 9 illustrates an example of a user interface for selecting a function of an electronic device according to an embodiment of the present invention.

FIG. 9 illustrates an example of a user interface for selecting a function of an electronic device according to an embodiment of the present invention.

Referring to FIG. 9, after a type and the number of the washing objects are selected, a screen interface for inputting information by functions of the electronic device is displayed for the washing objects. The information by functions of the electronic device includes information according to functions and an external environment of the electronic device. Specifically, the information by functions of the electronic device include electric charges by time periods 901, a weight of the washing objects 902, weather 903, and a home schedule 904.

The electric charges by time periods 901 indicate a time period for using washing machine with the cheapest electrical costs.

The weight of the washing objects 902 indicates a condition in which washing starts when the weight of the washing machine is equal to or greater than a predetermined value. For example, only when a weight of the washing objects included in the washing machine is in the range of 7 kg-10 kg, may the washing start.

The weather 903 indicates an external temperature, which may indicate temperature and humidity, which will affect. A reason why the temperature and the humidity being conditions of drying the washing object is important because the washing object needs dryness. The home schedule 904 includes a schedule of the user using the washing machine. The home schedule can be considered during analyzing operation information of the washing machine to avoid a time period when the user has a difficulty managing the washing machine, or a time period when the user is sleeping.

Additional functions may be added by selecting an empty, dotted line icon 905.

Figure 10:
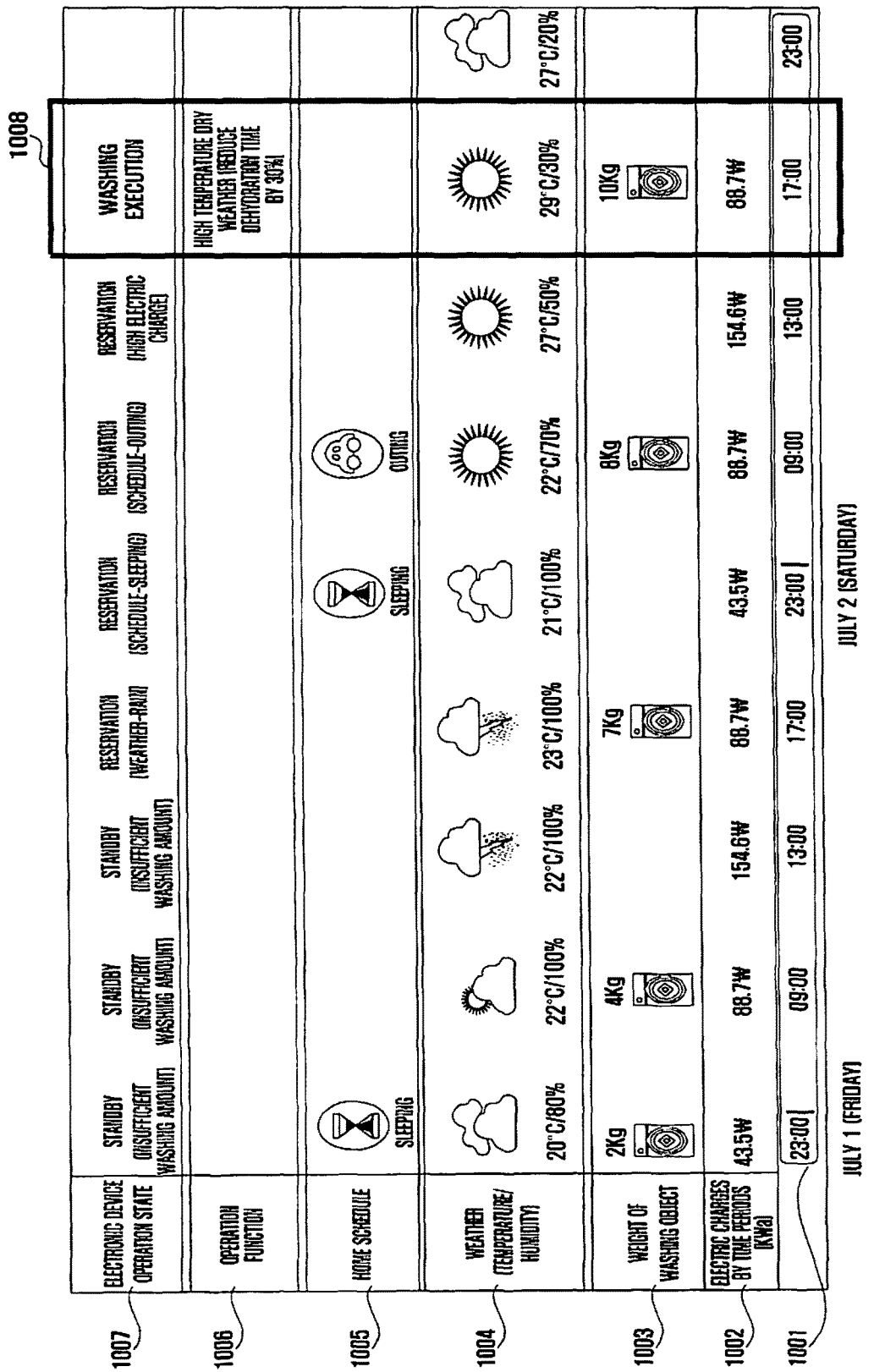
FIG. 10 is a diagram illustrating functions of a washing machine according to an embodiment of the present invention.

FIG. 10 is a diagram illustrating functions of a washing machine according to an embodiment of the present invention. Specifically, FIG. 10 illustrates an example of generating operation information of the washing machine using a function of the washing machine and external environment data.

Referring to FIG. 10, an appropriate weight of a washing object for washing of the washing machine is in the range of 7 kg-10 kg. Reference numeral 1001 indicates a time period when the washing machine is operated. There are not special limitations on time period 1001. However, if a user of the washing machine optionally selects the time period, it may be a restricted condition.

The electric charges 1002 by time periods indicate a fee added differently depending on the time periods when the washing machine is used. A washing time of a washing object may be selected with reference to the fee by time periods.

The washing machine may continuously check a weight 1003 of the washing object to determine that washing is possible when the weight 1003 exceeds 7 kg. The weight 1003 of the washing object may be changed according to convenience of the user or a function of the washing machine. The weather 1004 includes an external temperature and humidity.

Because the washing object needs to be dried after washing, the external temperature and humidity may be important. When there is a dry function inside the washing machine, conditions of the weather 1004 need not to be considered.

Temperature of 29° C. and humidity of 30% being conditions in which a weather is sufficient to dry the washing object may be selected.

A home schedule 1005 includes a schedule of a user of the washing machine in order to select an optimum time for running the washer when the user is home.

An operation function 1006 includes a function of the washing machine with reference to at least one of electric charges 1002 by time periods or a weight of a washing object. Because the washing object is well dried when the weather 1004 is a high temperature/dry in the operation function 1006, although a dehydration time is reduced by 30%, a possible condition is indicated. Accordingly, in high temperature/dry weather, the dehydration time among functions of the washing machine is reduced by 30%, so that a washing time and washing cost may be reduced.

An electronic device operation state 1007 indicates a time period satisfying all the conditions. Waiting indicates a state that a weight of a washing object is insufficient, and reservation may indicate a state that one or two of all the conditions are not satisfied.

Washing execution 1008 indicates a time period sufficient to start washing by a washing machine due to all satisfactory conditions.

A priority order of the conditions is a weight 1003 of the washing object, a next order is a home schedule 1005, a third order is a weather 1004, and a fourth order is electric charges 1002 by time periods.

An order of the condition may be divided into essential conditions and selection conditions, where an essential conduction is a condition that needs to be satisfied and the selection condition is a condition that may be satisfied. For example, the essential conditions may include a weight of a washing object and a home schedule 1005, the selection conditions may include a weather 1004 and electric charges 1002 by time periods.

If various conditions are not satisfied, a time period satisfying only the essential condition may be selected. A time period satisfying the essential conditions and having a selection condition of the greatest satisfaction among the selection conditions may be selected.

The function of the electronic device may be acquired through an electronic device, a server 300, or a managing device 100. Further, the external environment data may be acquired through the server 300 or the managing device 100.

The function of the electronic device and the external environment data are transmitted to the managing device 100 or the server 300 such that the terminal 200 may receive operation information of the electronic device. Furthermore, the terminal 200 may analyze the function of the electronic device and the external environment data to generate the operation information of the electronic device.

Accordingly, a washing machine may analyze internal/external situations through the operation information to select an optimal function and time to be operated. The operation information of the electronic device generated by the terminal 200 may be generated by the managing device 100, the electronic devices 400, or the server 300.

Figure 11:
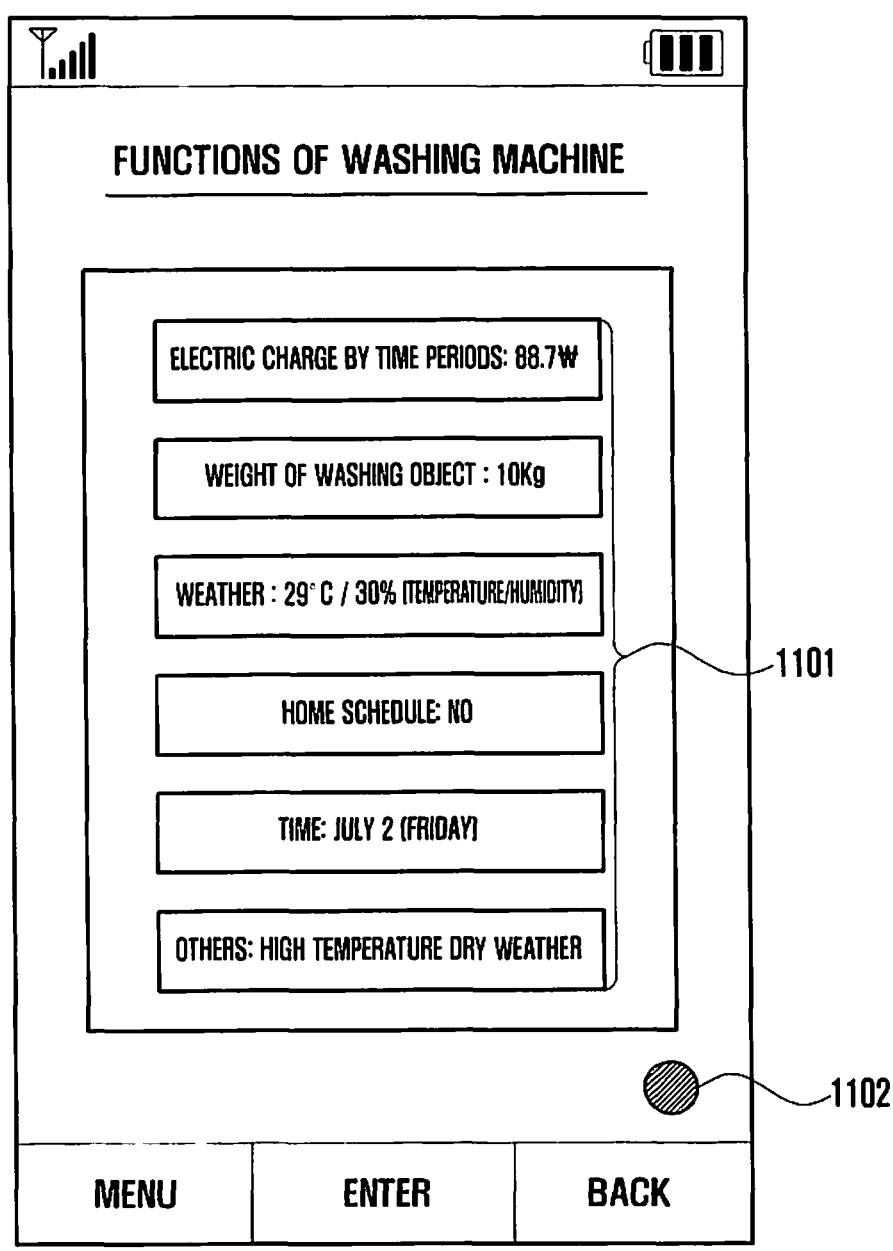
FIG. 11 illustrates an example of selected optimal conditions, presented on a terminal display according to an embodiment of the present invention.

FIG. 11 is a diagram illustrating selected optimal conditions according to an embodiment of the present invention.

Referring to FIG. 11, selected optimal conditions 1101 represent the optimal functions of the washing machine. When a change in the optimal conditions 1101 is required, the optimal conditions by functions may be selected and corrected. If a button 1102 is selected after the optimal conditions 1101 are completed, the optimal conditions 1101 are transmitted to the managing device 100 or the electronic device 400 such that the managing device 100 or the electronic device may be executed with a control command.

Figure 12:
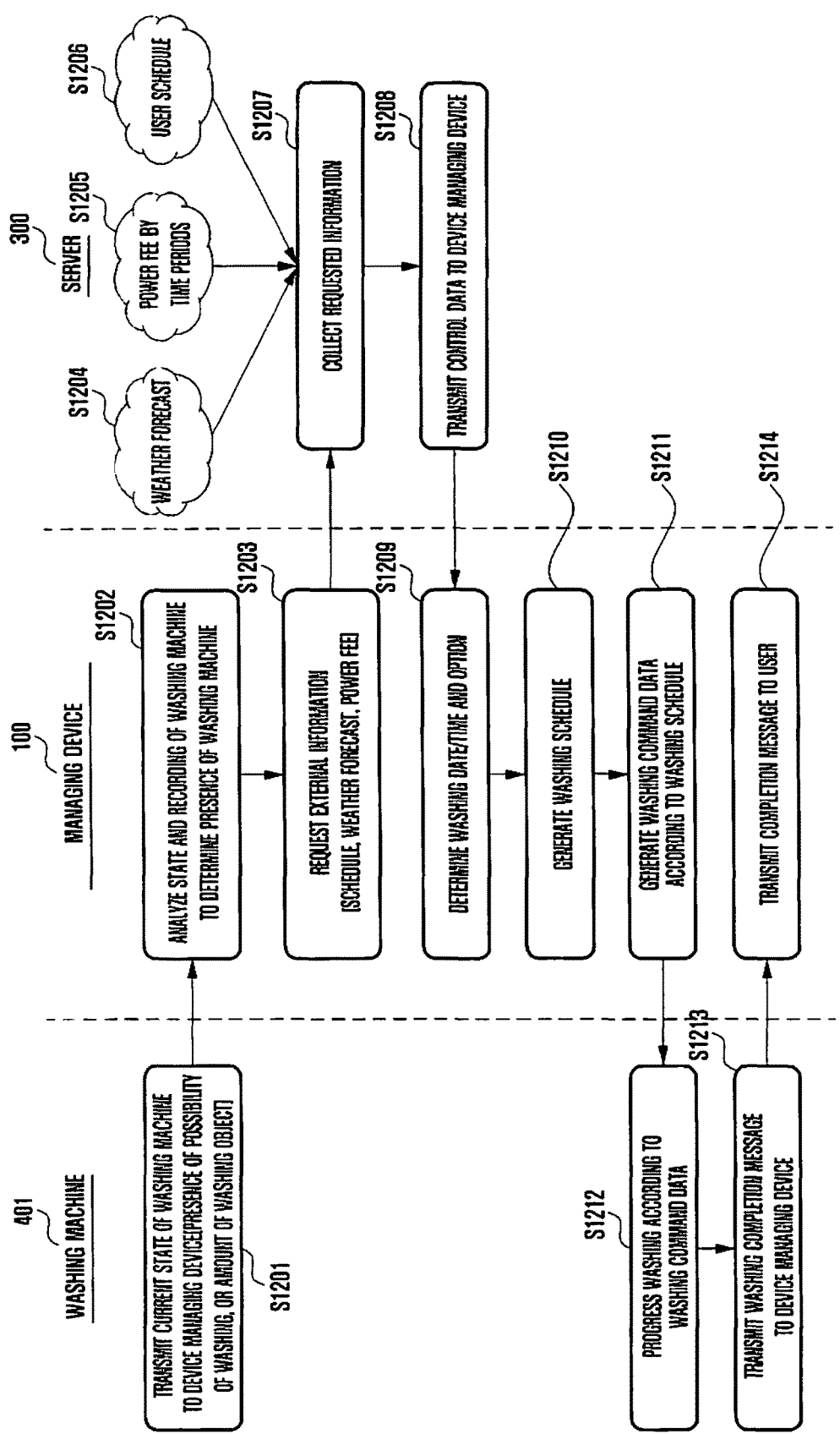
FIG. 12 is a flowchart illustrating a method for controlling a washing machine according to an embodiment of the present invention.

FIG. 12 is a flowchart illustrating a method for controlling a washing machine according to an embodiment of the present invention. Although the terminal 200 is omitted in FIG. 12 for the purpose of simplifying the description, a control signal may be transmitted through the terminal 200.

Referring to FIG. 12, in step S1201, a washing machine 401 transmits a current state of the washing machine 401 to the managing device 100. The current state of the washing machine may include a washing function according to a washing object, presence of possibility of washing, or an amount of washing objects.

In step S1202, the managing device 100 analyzes a state of the washing machine and a washing record received from the washing machine 400 to determine presence of washing.

In step S1203, the managing device 100 requests external information from the server 300. The external information may include a schedule of the user, weather forecast, or power fee by time periods.

In steps S1204-S1206, the server 300 acquires the external information in response to the request received from the managing device 100. Specifically, the server 300 acquires information of the weather forecast from a site of a meteorological observatory or a site supplying weather by dates in step S1204, and acquires data of power fee by time periods from a power company in step S1205. Further, the server 300 may compute a power fee by time periods based on an accumulated power fee.

The server 300 acquires a schedule of the user input which the user inputs through the managing device 100 or the terminal 200 in step S1206, and acquires and generates data for controlling a function of the washing machine, i.e., control data, based on the acquired external information in step 1207.

In step S1208, the server 300 transmits the control data to the managing device 100.

In step S1209, the managing device 100 determine functions of a washing date, a time, and an option of the washing machine 401, based on the received control data.

In step S1210, the managing device 100 generates a washing schedule of the washing machine and stores the washing schedule in a memory based on the determined functions.

In step S1211, the managing device 100 generates washing command data according to the washing schedule and transmits the generated washing command data to the washing machine 401.

In step S1212, the washing machine 401 may performs washing according to the received washing command data.

When the washing is completed, the washing machine 401 transmits a washing completion message to the managing device 100 in step S1213.

In step S1214, the managing device 100 transmits the received completion message to the user.

FIG. 13 is a diagram illustrating functions of an air conditioner according to environmental conditions according to an embodiment of the present invention. FIG. 13 has substantially the same operation principle as that of FIG. 10, but includes characteristics and functions that are applicable to a different electronic device, i.e., an air conditioner instead of a washing machine.

Referring to FIG. 13, the external environment conditions for the air conditioner include electric charges by time periods 1301, weather 1302, a home schedule 1303, an operation function 1304 indicating cooling and removing humidity of the air conditioner.

Functions of cooling and removing humidity being the operation function 1304 may be controlled in consideration of a temperature and humidity in the weather 1302. For example, when the temperature and the humidity are low, cooling and the removing humidity may be reduced. Conversely, when the temperature and the humidity are high, the cooling and the removing humidity may be increased.

The operation function 1304 may be restricted in consideration of the electric charges by time periods. For example, when the electric charges by time periods 1301 is relatively high, although the temperature is high, cooling may be reduced. Further, when the electric charges by time periods 1301 are relatively high, although the humidity is high, the removing humidity may be reduced.

A home schedule 1303 is analyzed. When the user is located in a space in which the air conditioner is installed, the air conditioner is operated. When the user is not located in the space, the user may switch the operation function 1304 from an outing state to a standby power blocking state.

When the user returns to the space according to the home schedule 1303 in the outing state, the user may increase the operation function 1304 of the air conditioner in units of slight amount.

During a peak time period (e.g., 1 P.M.) when electricity is used most, to reduce the electric charges by time periods 1301, an operating rate of the cooling may be increased by 100% in 12 A.M. before the peak time period, and the operating rate of the cooling may be reduced by 50%.

The electronic device operation state 1305 may include an operation state obtained by integrally analyzing the electric charges by time periods 1301, the weather 1302, or the home schedule 1303.

For example, the electronic device operation state 1305 refers to a condition of the weather 1302, to the electric charges by time periods 1301, or to the home schedule 1303. Accordingly, the function of the air conditioner may be operated according to the external environment condition.

Control data of the operation function 1304 may be received from the managing device 100 or the server 300. A cooling ratio and the removing humidity ratio of the operation function 1304 may indicate a used ratio to a maximum output value.

Through FIG. 13, the function of the air conditioner may be efficiently used according to the external environment, and accordingly the cost may be reduced.

FIG. 14 is a diagram illustrating functions of a refrigerator according to environmental conditions according to an embodiment of the present invention. FIG. 14 has substantially the same operation principle as that of FIG. 13, but includes characteristics and functions that are applicable to a different electronic device, i.e., a refrigerator instead of an air conditioner.

FIG. 14 is a diagram illustrating an operation function of a refrigerator according to situations integrally considering an external environment condition and a function of the refrigerator.

Referring to FIG. 14, the external environment condition includes electric charges by time periods 1401, an internal temperature 1402, weather 1403, a home schedule 1404, and general cooling, concentration cooling, and a human mode being an operation function 1405 of the refrigerator.

Because the internal temperature 1402 is affected by the weather 1403, the operation function 1404 of the refrigerator may be controlled.

For example, because the internal temperature 1402 may be increased if the temperature is high, a cooling function being the operation function 1405 may be increased. Because the internal temperature 1402 may be reduced if the temperature is low, the cooling function may be reduced.

The operation function 1405 may be restricted in consideration of the electric charges by time periods 1401. For example, when the electric charges 1401 by time periods are relatively high, although the temperature is high, the cooling may be reduced.

A home schedule 1404 is analyzed. Because the refrigerator door will not be opened the user is not home or sleeping, the operation function 1405 may be switched to a human mode, which reduces a cooling function of the refrigerator to maintain the internal temperature 1402 in an optimal temperature range. For example, an optimal temperature of the refrigerator may be set to a range of 1~3° C.

During a peak time period (e.g., between 1 and 4 P.M.) when electricity is used most, to reduce the electric charges 1401 by time periods, an operating rate of the cooling may be increased by 100% in 12 A.M. before the peak time period to progress concentration cooling, and the cooling may be switched to general cooling during the peak time period to reduce the cost.

When the peak time period is released, the general cooling may be switched to the concentration cooling to control the internal temperature 1402 of the refrigerator.

Cooling of the operation function 1405 may be divided into general cooling, concentration cooling, and a human mode according to a maximum output value.

The refrigerator may be operated with 50% of maximum output in the general cooling, operated with 100% of the maximum output in the concentration cooling, and operated with 10% of the maximum output in the human mode.

The electronic device operation state 1406 may include a state that the function of the refrigerator is operated obtained by integrally analyzing the electric charges by time periods 1401, an internal temperature 1402, weather 1403, or the home schedule 1404.

When the operation function 1404 is in the human mode, the electronic device operation state 1460 may be switched to a stop state in the middle of the human mode.

An internal temperature 1402 is analyzed. When the analyzed internal temperature 1402 is beyond the optimal temperature, the stop state may be switched to the operation state.

For example, the electronic device operation state 1406 refers to a condition of the internal temperature, to the home schedule 1404, to the electric charges by time periods 1401, and to weather 1403.

Accordingly, the function of the refrigerator may be operated according to the external environment condition. Control data of the operation function 1405 may be received from the managing device 100 or the server 300.

Through FIG. 14, the function of the refrigerator may be efficiently used according to the external environment, and accordingly the cost of operating the refrigerator may be reduced.

FIG. 15 is a diagram illustrating functions of a TV according to environmental conditions according to an embodiment of the present invention. FIG. 15 has substantially the same operation principle as that of FIG. 14, but includes characteristics and functions that are applicable to a different electronic device, i.e., a TV instead of a refrigerator.

Referring to FIG. 15, the external environment conditions include electric charges by time periods 1501, weather 1502, and a home schedule 1503, a general mode, a power saving mode, and a standby power blocking state being an operation function 1504 of the TV.

The general mode indicates a condition that enables a user to view the TV without controlling the function of the TV. The power saving mode indicates a condition, which partially control the function of the TV to reduce the electric charges. The standby power blocking state indicates a state which blocks power of the TV and enables the user not to view the TV.

Screen brightness of the TV among the operation function 1504 may be controlled according to the weather 1502.

For example, the screen brightness of the TV may be low controlled during bright weather 1502, and the screen brightness of the TV may be high controlled during dark weather 1502. The operation function 1504 may be restricted in consideration of the electric charges 1501 by time periods. For example, during the time period when the electric charges 1501 by time periods are relatively high, the screen brightness of the TV is controlled to switch the mode from the general mode to the power saving mode.

The home schedule 1503 is analyzed. When the user of the TV is not home or sleeping, the operation function 1504 may be switched to a standby power blocking state.

During a peak time period (e.g., 1 P.M.) when electricity is used most, to reduce the electric charges 1501 by time periods, the screen brightness of the TV may be controlled during the peak time period.

The electronic device operation state 1505 may include a state that the function of the TV is operated obtained by integrally analyzing the electric charges 1501 by time periods, the weather 1502, or the home schedule 1503.

The electronic device operation state 1505 refers to a condition of the home schedule, the electric charges 1501 by time periods, and the weather 1502. Accordingly, the function of the TV may be operated according to the external environment condition.

Control data of the operation function 1504 may be received from the managing device 100 or the server 300.

Through FIG. 15, the function of the TV may be efficiently used according to the external environment, and accordingly the cost may be reduced.

Figure 16:
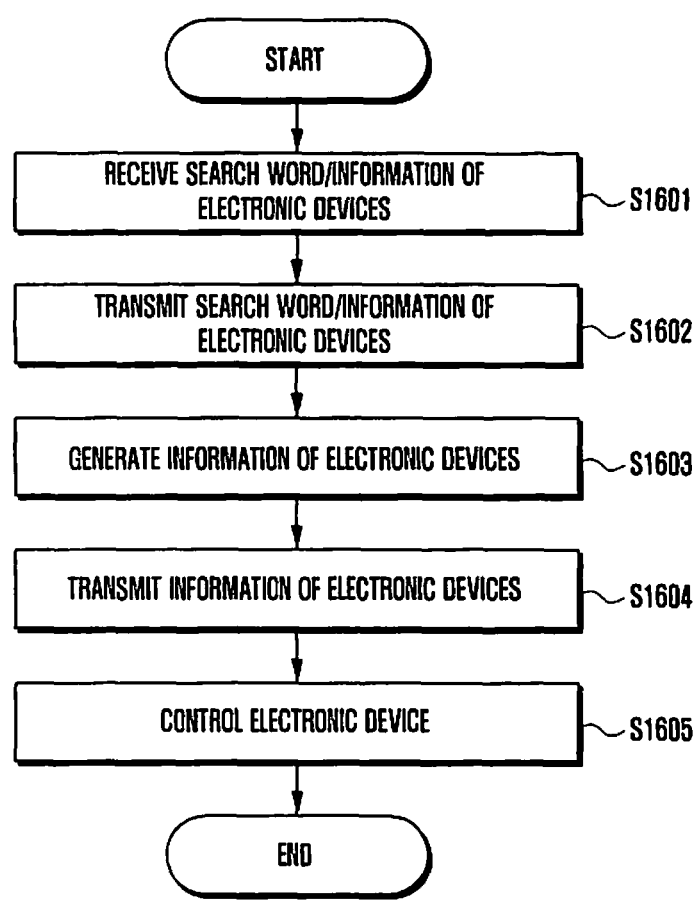
FIG. 16 is a flowchart illustrating a method for controlling an electronic device according to an embodiment of the present invention.

FIG. 16 is a flowchart illustrating a method for controlling an electronic device according to an embodiment of the present invention.

Referring to FIG. 16, in step S1601, the managing device 100 receives information of an electronic device from the terminal 200 or receives the information of the electronic device from electronic devices 400.

The managing device 100 may also receive a search word used in the electronic device from the terminal 200, and receive the search word from the electronic devices 400.

The managing device 100 generates operation information of the electronic device based on the information of the electronic device and the search word. In this case, the managing device 100 may receive and refer to external environment data.

In step S1602, the managing device 100 sends the information of the electronic device and the search word to the server 300. When a plurality of search words are received in step S1601, the managing device 100 may determine a priority with respect to the search words.

In step S1603, the server 300 analyzes the information of the electronic device and the search word. In this case, the server 300 may receive and refer to the external environment data.

In step S1603, the server 300 generates operation information of the electronic device by integrally analyzing the information of the electronic device, the search word, and the external environment data. Additionally, the server 300 may integrally the information of the electronic device, the search word, and the external environment data to acquire the operation information from a web server.

In step S1604, the server 300 transmits the operation information of the electronic device to at least one of the managing device 100, the terminal 200, and the electronic devices 400.

Specifically, the managing device 100 generates the operation information of the electronic device and may transmit the operation information of the electronic device to the terminal 200 to control the electronic device. Further, the managing device 100 may directly transmit the operation information of the electronic device to an electronic device suited to the operation information to control the electronic device.

In step S1605, the managing device 100 transmits the operation information of the electronic device to the terminal 200 to control the electronic device suing the terminal 200.

Additionally, the managing device 100 may transmit the operation information of the electronic device to an electronic device 400 suited to the operation information to control the electronic device.

The above-described embodiments of the present invention provide a system and method for providing convenience of use of an electronic device to a user and reduce the time/cost by analyzing a state of the electronic device and external information (e.g., weather, schedule, electronic rate, etc.) to select optional functions and operation time, such that the electronic device operates by itself.

Additionally, the above-described embodiments of the present invention permit the user to efficiently use an electronic device in consideration a state of the electronic device and external information.

Furthermore, the above-described embodiments of the present invention provide convenient use of the electronic device and reduce a used time and cost of the electronic device through the efficient use.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for controlling an electronic device by a managing device, the method comprising:
   receiving, by the managing device, a search word for identifying a task to be performed using the electronic device and situation information of the electronic device;
   acquiring, by the managing device, operation information associated with a function of the electronic device based on the received search word;
   generating, by the managing device, a schedule of the electronic device including an operation state of the electronic device to be performed by time periods determined based on the situation information of the electronic device and the acquired operation information; and
   controlling, by the managing device, the electronic device to perform the task based on the generated schedule,
   wherein the situation information includes a home schedule of when a user is home, electric charges by time periods, and weather, and
   wherein the acquired operation information comprises an operation information associated with a function for a plurality of search words, which is acquired by comparing a situation information and a function of the electronic device for each of the plurality of search words as the plurality of search words are received.

2. The method of claim 1, wherein acquiring the operation information comprises one of:
   searching operation information stored in the managing device based on the received search word; and
   transferring the received search word to a server and receiving the acquired operation information based on the search word from the server.

3. The method of claim 1, wherein the operation information of the electronic device includes information of an item to perform the task.

4. The method of claim 1, further comprising storing the generated schedule in a memory of the managing device.

5. The method of claim 1, wherein receiving the search word comprises receiving the search word via an input in the managing device or an input in a terminal.

6. The method of claim 1, further comprising outputting the acquired operation information.

7. The method of claim 6, wherein outputting the acquired operation information comprises outputting the acquired operation information through at least one of a display included in the managing device and a display unit included in a terminal.

8. A method for controlling an electronic device, comprising:
   receiving, by a terminal, a search word for identifying a task to be performed using the electronic device and situation information of the electronic device;
   transmitting, by the terminal, the received search word to a managing device;
   transmitting, by the managing device, the search word to a server;
   acquiring, by the server, operation information of the electronic device based on the search word;
   transmitting, by the server, the acquired operation information associated with a function of the electronic device to the managing device;
   generating, by the managing device, a schedule of the electronic device including an operation state of the electronic device to be performed by time periods determined based on the situation information of the electronic device and the acquired operation information; and
   controlling, by the managing device, an operation of the electronic device to perform the task based on the generated schedule,
   wherein the situation information includes a home schedule of when a user is home, electric charges by time periods, and weather, and
   wherein the acquired operation information comprises an operation information associated with a function for a plurality of search words, which is acquired by comparing a situation information and a function of the electronic device for each of the plurality of search words as the plurality of search words are received.

9. The method of claim 8, wherein the operation information of the electronic device includes information of an item to perform the task.

10. An electronic device comprising:
    a communication unit for transmitting, to a managing device, a search word for identifying a task to be performed using the electronic device and situation information of the electronic device, and receiving a schedule of the electronic device including an operation state of the electronic device to be performed by time periods from the managing device; and
    a controller for controlling an operation of the another electronic device to perform the task based on the schedule,
    wherein the schedule is generated based on the situation information of the electronic device and operation information associated with a function of the electronic device acquired by the managing device, and wherein the situation information includes a home schedule of when a user is home, electric charges by time periods, and weather, and wherein the operation information comprises an operation information associated with a function for a plurality of search words, which is acquired by comparing a situation information and a function of the electronic device for each of the plurality of search words as the plurality of search words are received.

11. The electronic device of claim 10, further comprising an input for receiving the search word.

12. The electronic device of claim 10, wherein the operation information of the electronic device includes information of an item to perform the task, and wherein the operation information of the electronic device acquired by the managing device.

13. A managing device comprising:
a communication unit for receiving a search word for identifying a task to be performed using an electronic device and situation information of the electronic device, and receiving operation information of the electronic device corresponding to the search word; and
a device management controller for acquiring the operation information associated with a function of the electronic device based on the search word, generating a schedule of the electronic device including an operation state of the electronic device to be performed by time periods determined based on the situation information of the electronic device and the acquired operation information, and controlling the electronic device to perform the task based on the generated schedule,
wherein the situation information includes a home schedule of when a user is home, electric charges by time periods, and weather, and
wherein the acquired operation information comprises an operation information associated with a function for a plurality of search words is acquired by comparing a situation information and a function of the electronic device for each of the plurality of search words as the plurality of search words are received.

14. The managing device of claim 13, further comprising a memory for storing the operation information.

15. The managing device of claim 13, further comprising an input for receiving the search word.

16. The managing device of claim 13, wherein the device management controller acquires the operation information by searching operation information corresponding to the search word, or by transmitting the search word to a sever and receiving the operation information from the server, searched based on the search word, and wherein the operation information of the electronic device includes information of an item to perform the task.

17. A terminal comprising:
an input for receiving a search word for identifying a task to be performed using an electronic device and situation information of the electronic device;
a radio frequency communication unit for transferring the received search word to a managing device, and receiving operation information associated with a function of the electronic device corresponding to the search word from the managing device; and
a terminal controller for controlling the electronic device to perform the task based on a schedule of the electronic device including an operation state of the electronic device to be performed by time periods,
wherein the schedule is generated based on the situation information of the electronic device and the received operation information,
wherein the situation information includes a home schedule of when a user is home, electric charges by time periods, and weather, and
wherein the received operation information comprises an operation information associated with a function for a plurality of search words, which is acquired by comparing a situation information and a function of the electronic device for each of the plurality of search words.

18. The terminal of claim 17, wherein the operation information of the electronic device includes information of an item to perform the task, and wherein the operation information of the electronic device is searched based on the search word by the managing device or by a server.

19. The terminal of claim 17, further comprising a terminal display for displaying of the received operation information and an operating situation of the electronic device depending on the search word.

20. A system comprising:
a terminal for providing a search word for identifying a task to be performed using an electronic device and situation information of the electronic device; and
a managing device for acquiring operation information of the electronic device corresponding to the search word, generating a schedule of the electronic device including an operation state of the electronic device to be performed by time periods determined based on the situation information of the electronic device and the acquired operation information associated with a function of the electronic device, and controlling the electronic device to perform the task based on the generated schedule,
wherein the situation information includes a home schedule of when a user is home, electric charges by time periods, and weather, and
wherein the acquired operation information comprises an operation information associated with a function for a plurality of search words, which is acquired by comparing a situation information and a function of the electronic device for each of the plurality of search words as the plurality of search words are received.

21. The system of claim 20, wherein the managing device acquires the operation information by searching operation information corresponding to the search word, or by transmitting the search word to a sever and receiving the operation information, from the server, searched by the server based on the search word, and wherein the operation information of the electronic device includes information of an item to perform the task.

* * * * *